(12) United States Patent
Rodriguez et al.

(10) Patent No.: US 8,475,073 B1
(45) Date of Patent: Jul. 2, 2013

(54) PIVOT CONNECTOR FOR MODULAR PLATFORM ASSEMBLIES

(75) Inventors: Manuel Rodriguez, Fenton, MI (US); Matt Janowak, Fenton, MI (US); Jeremy Masser, Fenton, MI (US)

(73) Assignee: Structural Plastics, Inc., Holly, MI (US)

( * ) Notice: Subject to any disclaimer, the term of this patent is extended or adjusted under 35 U.S.C. 154(b) by 277 days.

(21) Appl. No.: 13/042,579

(22) Filed: Mar. 8, 2011

(51) Int. Cl.
  *F16C 11/10* (2006.01)
(52) U.S. Cl.
  USPC ........................................................ 403/119
(58) Field of Classification Search
  USPC ................... 403/98, 103, 106, 113, 116, 117, 403/119; 52/69, 71, 116; 269/45, 67, 71, 269/104, 139, 236
  See application file for complete search history.

(56) References Cited

U.S. PATENT DOCUMENTS

| | | | |
|---|---|---|---|
| 757,712 A | 4/1904 | Arnold | |
| 1,131,399 A | 3/1915 | McGinley | |
| 2,161,956 A * | 6/1939 | Robertson | 403/98 |
| 2,189,056 A | 2/1940 | Carington | |
| 3,586,355 A * | 6/1971 | Magi | |
| 3,778,102 A | 12/1973 | Snyder et al. | |
| 3,860,209 A | 1/1975 | Strecker | |
| 4,065,890 A | 1/1978 | Fenner | |
| 4,400,856 A | 8/1983 | Tseng | |
| 4,714,222 A | 12/1987 | Kiesel et al. | |
| 5,325,738 A | 7/1994 | Bryne | |
| 5,626,435 A | 5/1997 | Wohlhüter | |
| 5,661,942 A | 9/1997 | Palmer | |
| 6,086,284 A | 7/2000 | Callahan | |
| 6,095,713 A | 8/2000 | Doyle et al. | |
| 6,595,825 B1 | 7/2003 | De Wilde | |
| 6,948,400 B2 * | 9/2005 | Nakamura et al. | 403/117 X |
| 7,344,144 B2 * | 3/2008 | Lin | 403/113 X |
| 7,708,239 B2 * | 5/2010 | Watanabe et al. | 403/113 X |

* cited by examiner

*Primary Examiner* — Gregory Binda
*Assistant Examiner* — Josh Skroupa
(74) *Attorney, Agent, or Firm* — Young Basile Hanlon & MacFarlane P.C.

(57) ABSTRACT

A pivot connector has a first connecting part and a second connecting part. The first connecting part has a male pivot member and a first mounting member that is connected to the male pivot member. The second connecting part has a female pivot member and a second mounting member that is connected to the female pivot member. The first connecting part is connectable to the second connecting part such that a first engagement surface of the male pivot member is in engagement with a second engagement surface of the female pivot member. Each tab of a plurality tabs of the male pivot member is receivable in a respective slot of a plurality arcuate slots of the female pivot member such that the first connecting part is pivotable with respect to the second connecting part over a limited range of motion.

20 Claims, 8 Drawing Sheets

PIVOT CONNECTOR FOR MODULAR PLATFORM ASSEMBLIES

TECHNICAL FIELD

The disclosure relates to the field of modular platform assemblies, and more particularly, to a pivot connector for modular platform assemblies and to modular platform assemblies incorporating pivot connectors.

BACKGROUND

Modular platform assemblies are known in which platform members include legs that interconnect platforms using receivers on the platforms that connect to the legs without the need for additional fasteners. For example, modular platform assemblies are known in which tubular legs are connectable to individual platforms by placing an end portion of the tubular leg within a receiver that is complementary in shape and size to the external dimensions of the support legs. In a retail environment or in an industrial environment, modular support platforms that do not require external fasteners eliminate the possibility that such fasteners could be lost when not in use.

Modular platform assemblies of this type are often limited to orthogonal constructions. The receivers are arranged such that the support legs that are received within them extend substantially perpendicular to the surface of the platform. While this results in a simple structure with few parts, some degree of flexibility is sacrificed by this manner of geometric limitation.

Need remains for a pivot connector for modular platform assemblies that allows some degree of flexibility in platform configuration while minimizing the number of parts required and retaining the simplicity of the platform assembly.

SUMMARY

The disclosure is directed to pivot connectors and platform assemblies incorporating pivot connectors.

One pivot connector taught herein has a first connecting part and a second connecting part. The first connecting part has a male pivot member that includes a first engagement surface and a plurality of tabs that extend outward from the first engagement surface. The first connecting part also has a first mounting member that is connected to the male pivot member.

The second connecting part has a female pivot member that includes a second engagement surface and a plurality of arcuate slots that extend through the second engagement surface. The second connecting part also has a second mounting member that is connected to the female pivot member.

The first connecting part is connectable to the second connecting part such that the first engagement surface of the male pivot member is in engagement with the second engagement surface of the female pivot member. Each tab of the plurality tabs is receivable in a respective slot of the plurality arcuate slots such that the first connecting part is pivotable with respect to the second connecting part over a limited range of motion.

One platform assembly taught herein has a platform having a receiver formed therein, a leg, a first connecting part and a second connecting part. One of the first mounting member of the first connecting part or the second mounting member of the second connecting part is disposed within the leg, and the other of the first mounting member of the first connecting part or the second mounting member of the second connecting part is disposed within the receiver of the platform.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
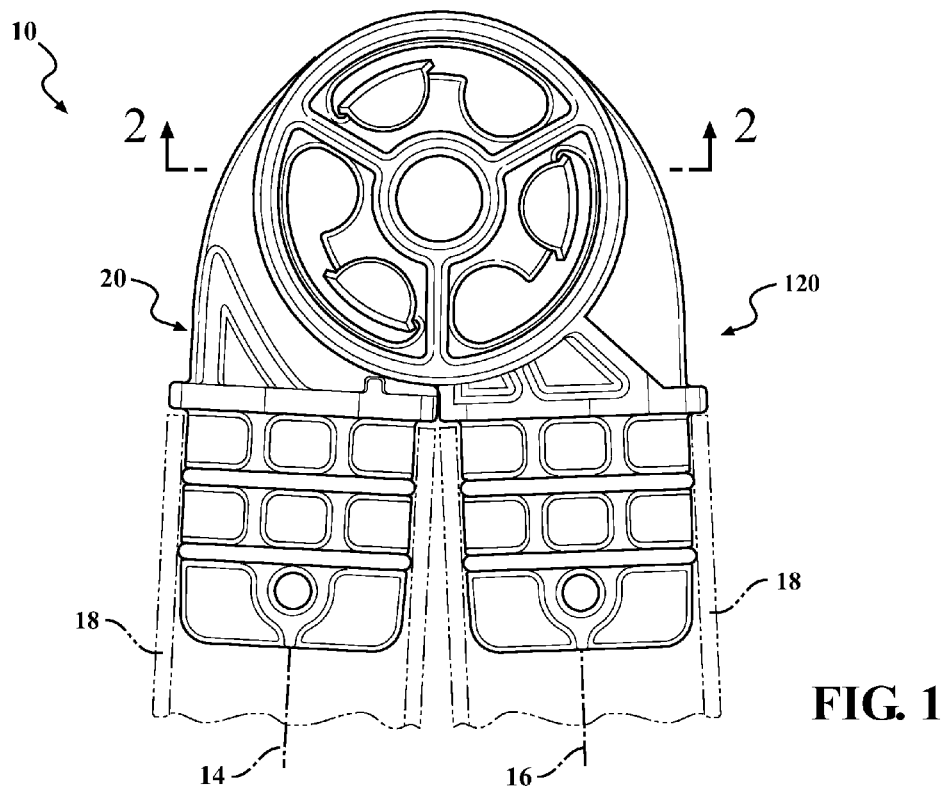
FIG. 1 is a side view of a pivot connector having a first connecting part and a second connecting part disposed in a first configuration with respect to one another.
Figure 2:
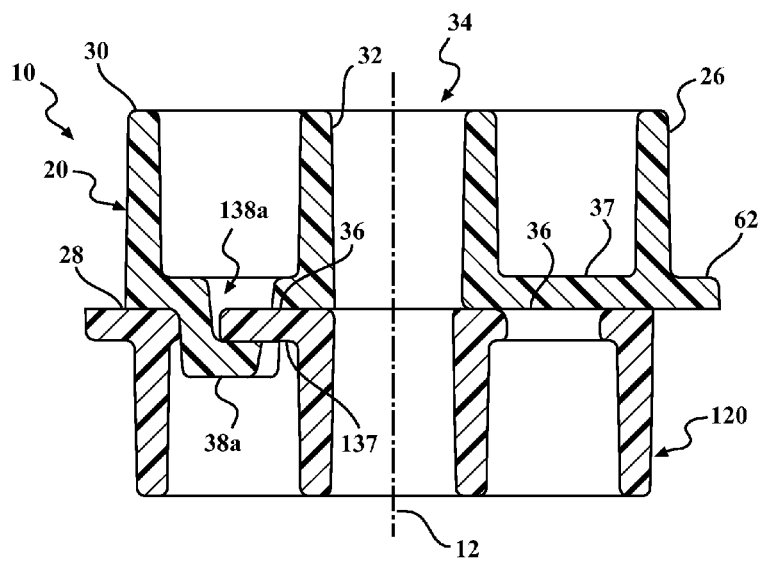
FIG. 2 is a cross section view of the pivot connector taken along line 2-2 of FIG. 1.

FIGS. 1-2 show a pivot connector 10 having a first connecting part 20 and a second connecting part 120. The first connecting part 20 is connectable to the second connecting part 120 such that the first connecting part 20 is pivotable with respect to the second connecting part 120 about a pivot axis 12.

Figure 3:
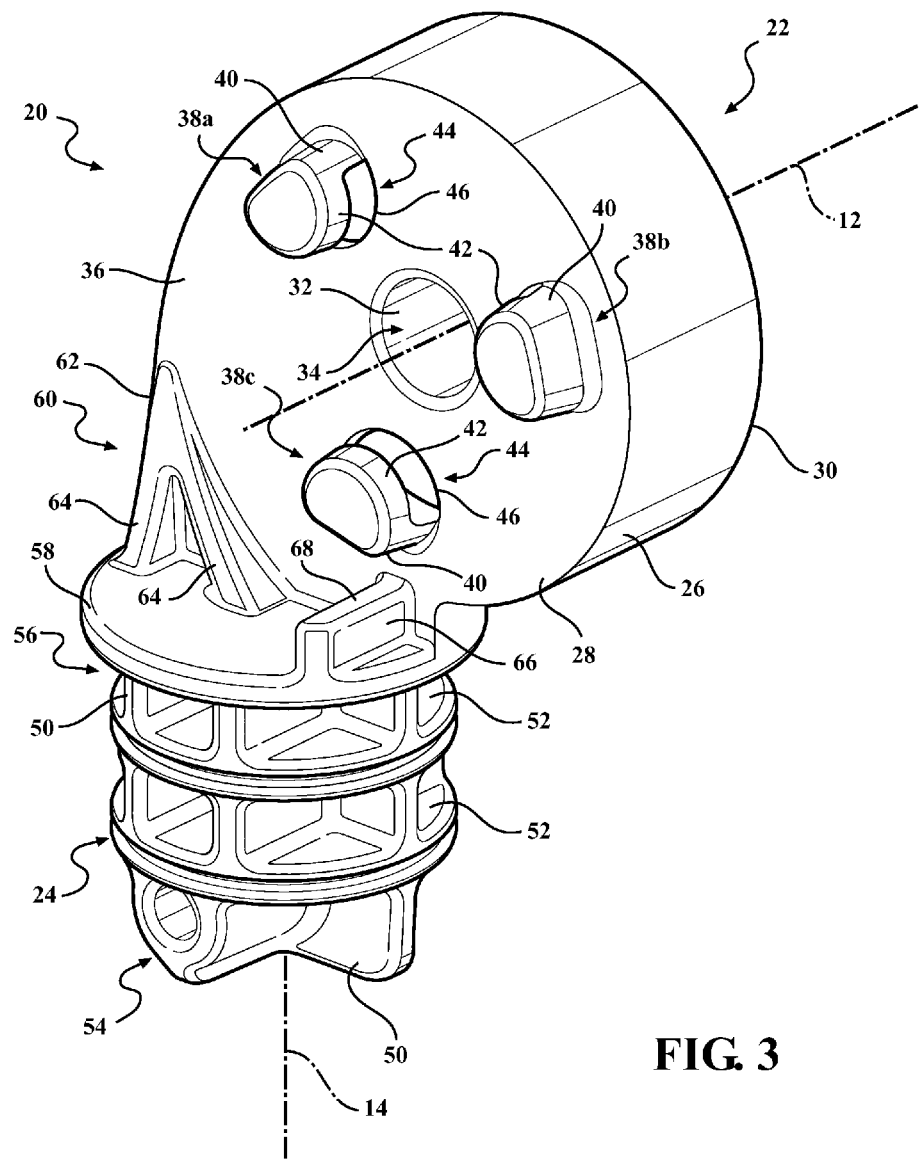
FIG. 3 is a front perspective view of the first connecting part.
Figure 4:
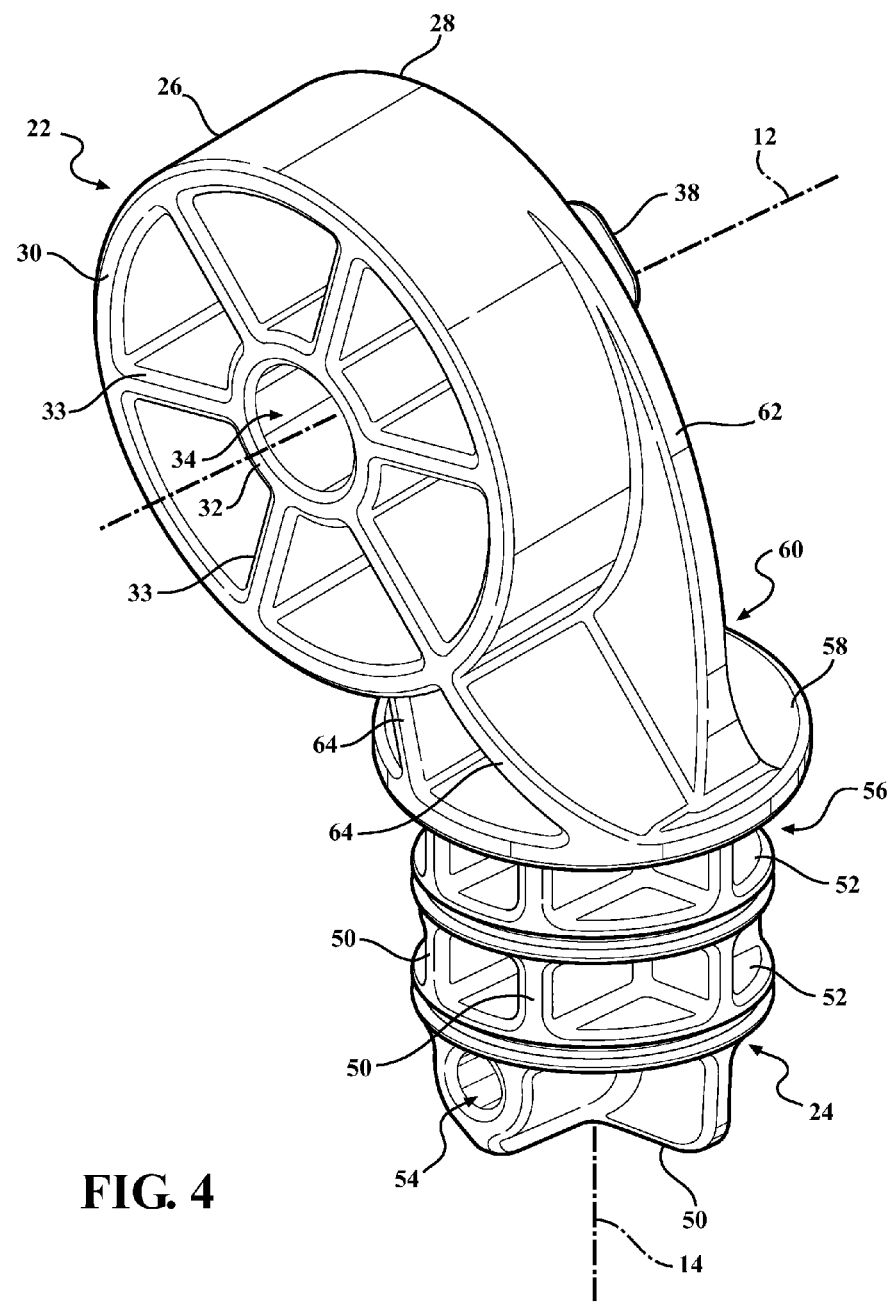
FIG. 4 is a rear perspective view of the first connecting part.

As shown in FIGS. 3-4, the first connecting part 20 includes a male pivot member 22 and a first mounting member 24. The male pivot member 22 is connected to the first mounting member 24. The male pivot member 22 may be connected to the first mounting member 24 by fabrication of the first connecting part 20 as a unitary structure. For example, the male pivot member 22 and the first mounting member 24 could be fabricated from plastic as a unitary body. Furthermore, the male pivot member 22 and the first mounting member 24 could be formed by injection molding to define the first connecting part 20 as a unitary plastic structure.

The male pivot member 22 is a generally cylindrical structure that extends along the pivot axis 12. The male pivot member 22 has an outer periphery that is defined by an outer annular wall 26 that extends along the pivot axis 12 and has the pivot axis 12 at its radial center. The outer annular wall 26 extends from a first end 28 of the male pivot member 22 to a second end 30 of the male pivot member 22.

The male pivot member 22 may include an inner annular wall 32 that is spaced radially inward from the outer annular wall 26. The inner annular wall 32 extends along the pivot axis 12 from the first end 28 to the second end 30 of the male pivot member 22 and has the pivot axis 12 as its radial center.

Thus, the inner annular wall 32 and the outer annular wall 26 may define concentric structures.

The inner annular wall 32 defines a hollow, substantially cylindrical central passageway 34 that extends through the male pivot member 22 along the pivot axis 12. The central passageway 34 could have open ends or closed ends at the first end 28 and the second end 30 of the male pivot member 22. For example, the central passageway 34 could be provided with open ends to allow an external structure (not shown in FIGS. 3-4), such as a rod, to be received within and optionally extend through the central passageway 34.

A first engagement surface 36 is located at the first end 28 of the male pivot member 22. The first engagement surface could be substantially planar. For example, the first engagement surface 36 could extend in a plane that is substantially perpendicular to the pivot axis 12.

The first engagement surface 36 may extend from the inner annular wall 32 to the outer annular wall 26. In other words, an outer periphery of the first engagement surface 36 may be formed by the outer annular wall 26, while an inner periphery of the first engagement surface 36 may be defined by the inner annular wall 32. Alternatively, the first engagement surface 36 could extend radially inward at the inner annular wall 32, thereby defining a closed end for the central passageway 34.

The rigidity and strength of the male pivot member 22 can be enhanced by providing a plurality of support ribs 33. Each support rib 33 extends radially outward from the inner annular wall 32 toward the outer annular wall 26. The support ribs 33 also extend from an interior axial surface 37 (FIG. 2) that is defined by the male pivot member 22 opposite the first engagement surface 36 toward the second end 30 of the male pivot member 22. In the illustrated embodiment, six support ribs 33 are disposed at an equal angular spacing with respect to each other. However, any number of support ribs 33 could be provided, and the angular spacing between them need not be equal.

A plurality of tabs 38a-38c are formed on the first engagement surface 36. For example, a first tab 38a, a second tab 38b, and a third tab 38c could be formed on the first engagement surface 36. The plurality of tabs 38a-38c and the first engagement surface 36 of the male pivot member 22 are engageable with the second connecting part 120 to establish a pivotal connection between the first and second connecting parts 20, 120, as will be described herein.

The tabs 38a-38c of the male pivot member 22 extend outward from the first engagement surface 36. In the illustrated embodiment, three tabs 38a-38c are formed on the first engagement surface 36 of the male pivot member 22. In the illustrated embodiment, three tabs 38a-38c are provided on the first engagement surface 36 in a circular array having the pivot axis 12 at its center. Thus, each tab of the plurality of tabs 38a-38c is radially equidistant from the pivot axis 12. Given that they are disposed in a circular array, adjacent pairs of tabs 38a-38c of the plurality of tabs 38a-38c are angularly spaced by an angle that is a function of the number of tabs 38a-38c that are formed on the first engagement surface 36 given that the tabs 38a-38c are at equal angular spacings with respect to one another. Thus, if three tabs 38a-38c are provided, as in the illustrated embodiment, adjacent pairs of the tabs 38a-38c are disposed at an angular spacing of 120° with respect to one another.

In the radial direction, each of the tabs 38a-38c is radially spaced from the outer annular wall 26. Each of the tabs 38a-38c is also radially spaced from the inner annular wall 32 and the central passageway 34.

Each of the tabs 38a-38c includes a first portion 40 and a second portion 42. The first portion 40 of each tab 38a-38c extends outward with respect to the first engagement surface 36. The first portion 40 of each tab 38a-38c could extend substantially perpendicular to the first engagement surface 36. The first portion 40 of each tab 38a-38c could extend in a direction that is parallel to the pivot axis 12. The first portion 40 of each of the tabs 38a-38c could be in the form of an arcuate wall extending in an arc having its center at the pivot axis 12 such that the arcuate wall defined by the first portion 40 remains substantially equidistant from the pivot axis 12 throughout its length.

The second portion 42 of each of the tabs 38a-38c is connected to the first portion 40 of the respective tab 38a-38c. Each second portion 42 is connected to the first portion 40 of the respective tab 38a-38c such that it is spaced from the first engagement surface 36. Each second portion 42 could be spaced from the first engagement surface 36 in an axial direction that is parallel to the pivot axis 12. Each second portion 42 could be substantially planar in that it includes one or more surfaces that extend in a plane that is substantially parallel to the plane defined by the first engagement surface 36.

Together, the first and second portions 40, 42 of each of the tabs 38a-38c cooperate to define a channel 44 in which a portion of the second connecting part 120 is receivable to connect the first connecting part 20 with respect to the second connecting part 120, as will be explained herein. Opposite the second portion 42 of each of the tabs 38a-38c, however, an aperture 46 may be defined that extends through the first engagement surface 36 and is complementary in size to the second portion 42. The first portion 40 of each of the tabs 38a-38c is formed adjacent to the aperture 46 defined opposite the respective second portion 42 of the tab 38a-38c.

The first mounting member 24 extends along a first mounting axis 14. That is to say that a substantially consistent cross-section is defined by the first mounting member 24 and extends along the first mounting axis 14. The first mounting member 24 is configured to be received within a complementary receiving structure, such as a tubular member 18. Suitable cross-sectional shapes for the first mounting member 24 include, but are not limited to, a circular cross-section, a square cross-section, a rectangular cross-section, or a polygonal cross-section. For example, the first mounting member 24 could be substantially cylindrical.

The first mounting member 24 may be configured to define a friction fit with respect to the tubular member 18. The exterior of the first mounting member 24 may establish a friction fit with the interior of the tubular member 18 directly, or the friction fit may be established by an annular groove on the exterior of the first mounting member 24 and an associated O-ring 25 (FIGS. 7-8) that is received in the groove. This allows the first mounting member 24 to be used with tubular members 18 of varying inside diameter, by selective use or non-use of the O-ring 25.

The structure of the first mounting member 24 may be constructed in any suitable way that results in the desired cross-sectional shape and provides sufficient strength for the first mounting member 24. As an example, the first mounting member 24 could be defined by a series of intersecting radially-extending walls 50 and axially-extending walls 52.

The first mounting member 24 extends from a free end 54 to a fixed end 56. At the fixed end 56, the first mounting member 24 extends from a radially-extending stop flange 58. The stop flange 58 has a cross-sectional area that is slightly larger than that of the first mounting member 24 itself. For example, the stop flange 58 can be sized to correspond with the size of the tube or receiver in which the first mounting member 24 will be received, to limit the maximum degree of insertion of the first mounting member 24 into the tube or receiver.

The stop flange 58 is connected to the male pivot member 22 by a connecting portion 60 that is at least partially interposed between the male pivot member 22 and the stop flange 58. The connecting portion 60 includes structure sufficient to connect the stop flange 58 and the male pivot member 22. The connecting portion 60 could be formed from a plurality of intersecting flanges, including a primary flange 62 and one or more lateral flanges 64. However, any other suitable structure may be used.

The primary flange 62 is connected to the outer annular wall 26 of the male pivot member 22 and to the stop flange 58. The primary flange 62 is disposed at the first end 28 of the male pivot member 22. The primary flange 62 may be positioned such that a portion of the first engagement surface 36 extends continuously past the outer annular wall 26 of male pivot member 22 onto the primary flange 62.

The lateral flanges 64 extend outward from the primary flange 62 and may also be connected to the stop flange 58. The lateral flanges 64 may each extend perpendicularly from the primary flange 62 toward the second end 30 of the male pivot member 22, or away from the first engagement surface 36. The lateral flanges 64 that extend toward the second end 30 are connected to the outer annular wall 26 of the male pivot member 22 and may terminate, for example, at the second end 30 of the male pivot member 22 and at the outer periphery of the stop flange 58.

One or more stabilizer flanges 66 may be formed on either or both of the primary flange 62 and the stop flange 58. The stabilizer flange 66 is positioned adjacent to the first engagement surface 36. The stabilizer flange 66 extends outward from either or both of the primary flange 62 and the stop flange 58. The stabilizer flange 66 extends outward from the primary flange 62 in the direction of the pivot axis 12. The stabilizer flange 66 could extend outward from the primary flange 62 toward the outer periphery of the stop flange 58.

The stabilizer flange 66 has an end portion 68 that is configured to be closely adjacent to the second connecting part 120 when the first and second connecting parts 20, 120 are assembled. Thus, the stabilizer flange 66 is engageable with the second connecting part 120 to stabilize the first connecting part 20 with respect to the second connecting part 120 by restraining the first and second connecting parts 120 against large deviations in alignment with respect to the pivot axis 12.

The first mounting axis 14 may extend substantially perpendicular to the pivot axis 12. Also, the first mounting axis 14 could be offset from the pivot axis 12 such that the two do not intersect. For example, the first mounting axis 14 could be offset with respect to the pivot axis 12 by a distance that is equal to or greater than half of the width or diameter of the first mounting member 24. Offsetting the first mounting axis 14 in this manner minimizes impingement between the first connecting part 20 and the second connecting part 120 thereby increasing the range of pivotal motion that is possible between the first connecting part 20 and the second connecting part 120.

Figure 5:
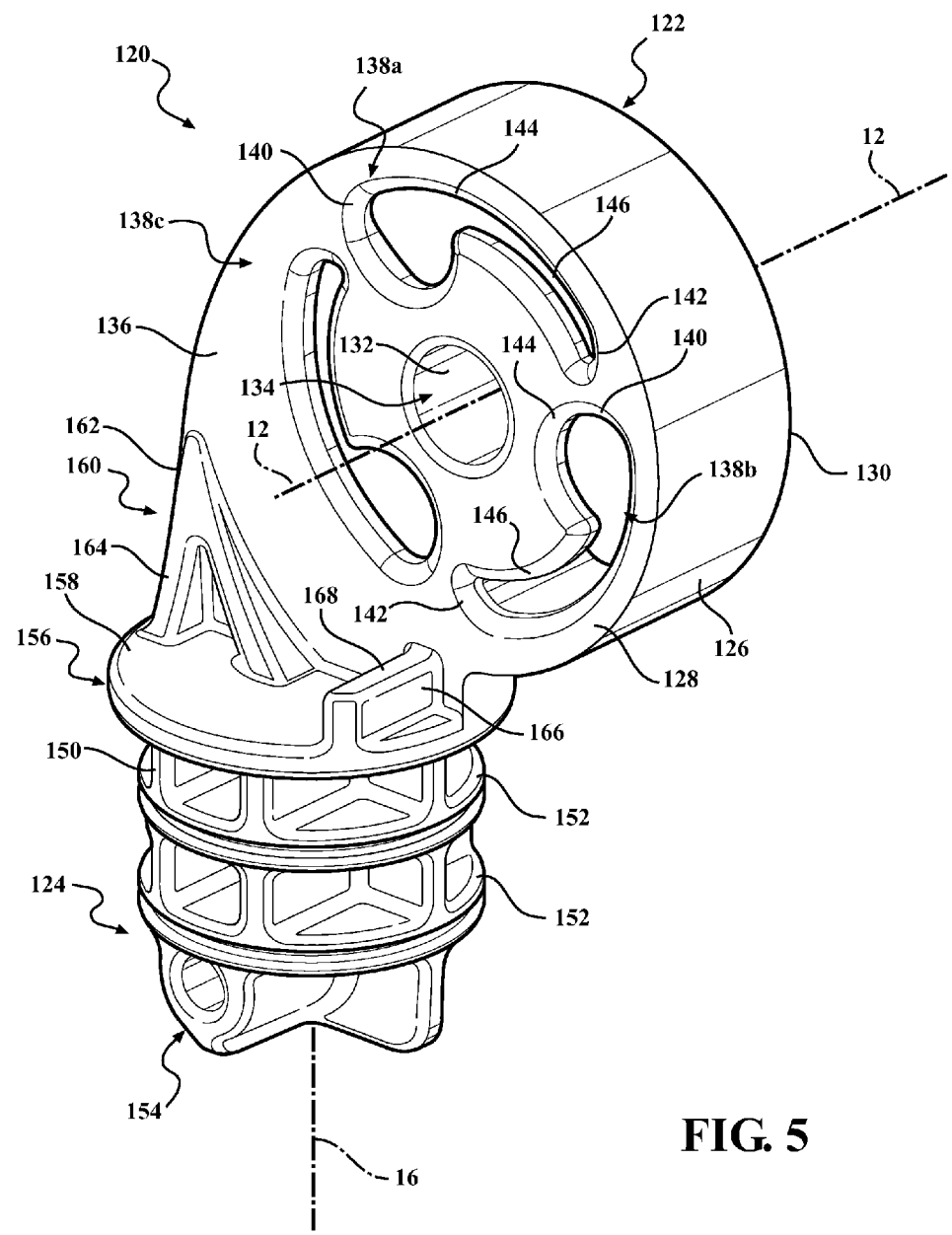
FIG. 5 is a front perspective view of the second connecting part.
Figure 6:
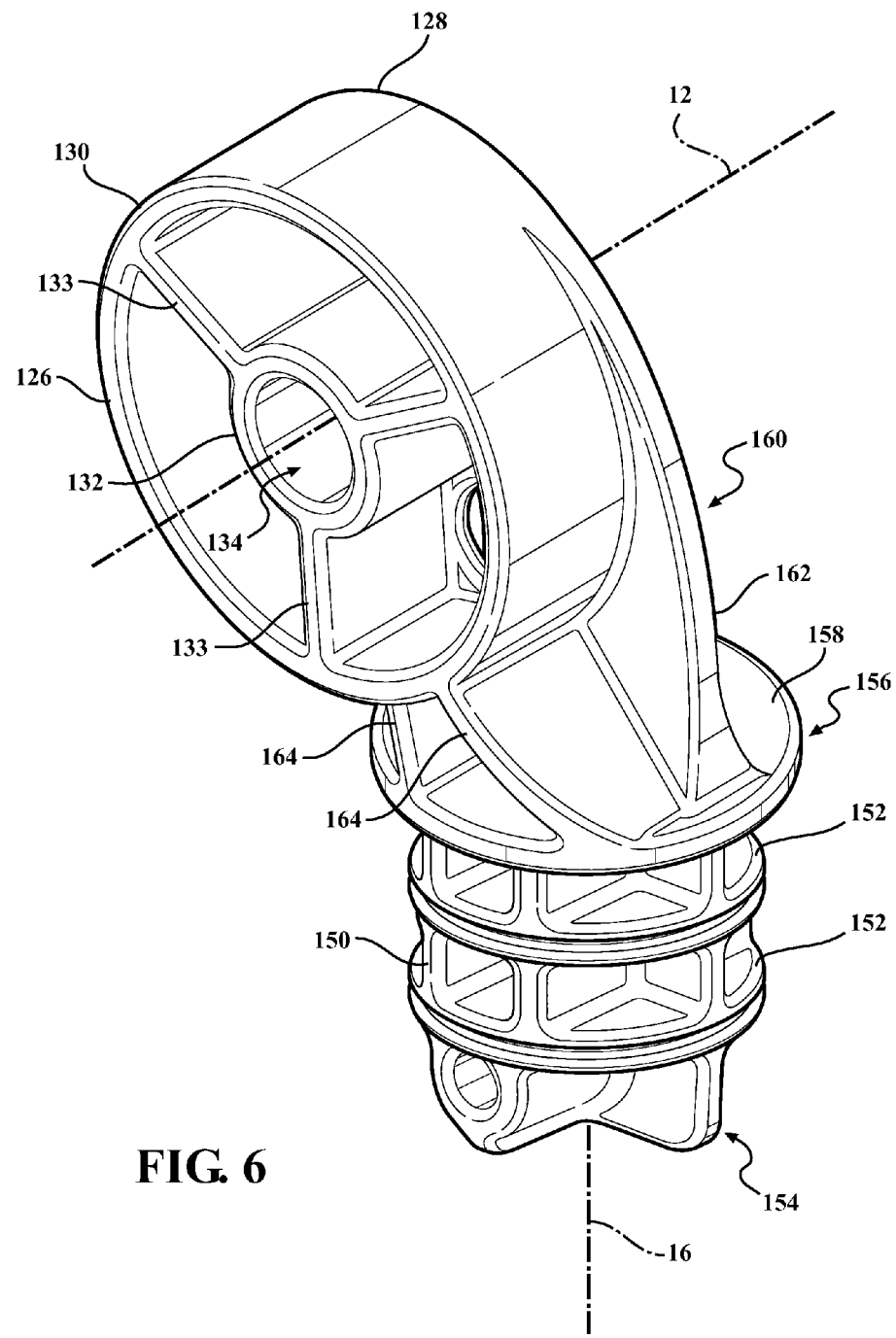
FIG. 6 is a rear perspective view of the second connecting part.

As shown in FIGS. 5-6, the second connecting part 120 includes a female pivot member 122 and a second mounting member 124. The female pivot member 122 is connected to the second mounting member 124. The female pivot member 122 may be connected to the second mounting member 124 by fabrication of the second connecting part 120 as a unitary structure. For example, the female pivot member 122 and the second mounting member 124 could be fabricated from plastic as a unitary body. Furthermore, the female pivot member 122 and the second mounting member 124 could be formed by injection molding to define the second connecting part 120 as a unitary plastic structure.

The female pivot member 122 is a generally cylindrical structure that extends along the pivot axis 12. The female pivot member 122 has an outer periphery that is defined by an outer annular wall 126 that extends along the pivot axis 12 and has the pivot axis 12 at its radial center. The outer annular wall 126 extends from a first end 128 of the female pivot member 122 to a second end 130 of the female pivot member 122.

The female pivot member 122 may include an inner annular wall 132 that is spaced radially inward from the outer annular wall 126. The inner annular wall 132 extends along the pivot axis 12 from the first end 128 to the second end 130 of the female pivot member 122 and has the pivot axis 12 as its radial center. Thus, the inner annular wall 132 and the outer annular wall 126 may define concentric structures.

The inner annular wall 132 defines a hollow, substantially cylindrical central passageway 134 that extends through the female pivot member 122 along the pivot axis 12. The central passageway 134 could have open ends or closed ends at the first end 128 and the second end 130 of the female pivot member 122. For example, the central passageway 134 could be provided with open ends to allow an external structure (not shown in FIGS. 5-6), such as a rod, to be received within and optionally extend through the central passageway 134.

A second engagement surface 136 is located at the first end 128 of the female pivot member 122. The second engagement surface could be substantially planar. For example, the second engagement surface 136 could extend in a plane that is substantially perpendicular to the pivot axis 12.

The second engagement surface 136 may extend from the inner annular wall 132 to the outer annular wall 126. In other words, an outer periphery of the second engagement surface 136 may be formed by the outer annular wall 126, while an inner periphery of the second engagement surface 136 may be defined by the inner annular wall 132. Alternatively, the second engagement surface 136 could extend radially inward at the inner annular wall 132, thereby defining a closed end for the central passageway 134.

The rigidity and strength of the female pivot member 122 can be enhanced by providing a plurality of support ribs 133. Each support rib 133 extends radially outward from the inner annular wall 132 toward the outer annular wall 126. The support ribs 133 also extend from an interior axial surface 137 (FIG. 2) that is defined by the female pivot member 122 opposite the second engagement surface 136 toward the second end 130 of the female pivot member 122. That is to say that the interior axial surface 137 and the second engagement surface 136 are formed on a common wall of the female pivot member 122, on opposite sides with respect to one another. In the illustrated embodiment, three support ribs 133 are disposed at an equal angular spacing with respect to each other. However, any number of support ribs 133 could be provided, and the angular spacing between them need not be equal.

The female pivot member 122 includes a plurality of slots 138a-138c. Each slot of the plurality of slots 138a-138c is formed through the second engagement surface 136. For example, a first slot 138a, a second slot 138b, and a third slot 138c could each be formed through the second engagement surface 136. The plurality of slots 138a-138c and the second engagement surface 136 of the female pivot member 122 are engageable with the plurality of tabs 38a-38c and the first engagement surface 36 of the first connecting part 20 to establish a pivotal connection between the first and second connecting parts 20, 120, as will be described herein.

In the illustrated embodiment, three slots 138a-138c are formed through the second engagement surface 136 of the female pivot member 122. The slots 138a-138c may be equal in number to the number of the tabs 38a-38c that are provided on the male pivot member 22 of the first connecting part 20. The support ribs 133 may be located between adjacent pairs of the slots 138a-138c.

The slots 138a-138c are disposed in a circular array having the pivot axis 12 at its center. Thus, each slot of the plurality of slots 138a-138c is radially equidistant from the pivot axis 12. Given that they are disposed in a circular array, the slots 138a-138c may be disposed at equal angular spacing with respect to one another.

In the radial direction, each of the slots 138a-138c is radially spaced from the outer annular wall 126. Each of the slots 138a-138c is also radially spaced from the inner annular wall 132 and the central passageway 134.

Each of the slots 138a-138c is substantially arcuate. In particular, each slot 138a-138c extends along an arc having its radial center position at the pivot axis 12. Stated another way, the slots 138a-138c are positioned such that they extend along a circle that is centered upon the pivot axis 12 and is concentric to the outer annular wall 126 and the inner annular wall 132 of the female pivot member 122. This configuration allows the tabs 38a-38c of the male pivot member 22 of the first connecting part 20 to be received within the slots 138a-138c while allowing the first connecting part 20 and the second connecting part 120 to pivot with respect to one another.

Each of the slots 138a-138c extends from a first end 140 to a second end 142 that are located opposite one another along the arc defined by each of the slots 138a-138c. When the first connecting part 20 is assembled with respect to the second connecting part 120, the tabs 38a-38c of the male pivot member 22 are received within the slots 138a-138c and are able to slide within the slots 138a-138c between the first end 140 and the second end 142 of each of the slots 138a-138c. This allows pivotal motion of the first connecting part with respect to the second connecting part 120 over a limited range of motion that is defined by the length of each slot 138a-138c.

Each of the slots 138a-138c includes an entry portion 144 and a retaining portion 146. The entry portion 144 is located adjacent to the first end 140 of each of the slots 138a-138c. The entry portion 144 is wider than the retaining portion 146, as measured in a radial direction extending outward from the pivot axis 12 toward the outer annular wall 126 of the female pivot member 122. In particular, the entry portion 144 has a size and shape that is complementary to the size and shape of the second portion 42 of each of the tabs 38 of the male pivot member 22 of the first connecting part 20. The entry portion 144 is slightly larger than the second portion 42 of each tab 38a-38c, in order to allow the second portion 42 of each of the tabs 38a-38c to pass through the entry portion 144 of each of the slots 138a-138c. After the tabs 38a-38c pass through the entry portions 144 of the slots 138a-138c, the first connecting part 20 and the second connecting part 120 may be pivoted with respect to one another about the pivot axis 12. This moves the tabs 38a-38c along the slots 138a-138c toward the second ends 142 thereof, causing the tabs 38a-38c to enter the retaining portions 146 of the slots 138a-138c.

The retaining portions 146 of the slots 138a-138c are configured to prevent the first connecting part 20 from moving axially with respect to the second connecting part 120 by engagement of the second portions 42 of the tabs 38a-38c with the interior axial surface 137 of the female pivot member 122 in the area adjacent to the slots 138a-138c. In particular, the size of the slots 138a-138c and the retaining portion 146 is complementary to and slightly wider than the radial width of the first portions 40 of the tabs 38a-38c of the male pivot member 22. The retaining portions 146 of the slots 138a-138c each extend from the entry portion 144 of the respective slot 138a-138c to the second end 142 of the respective slot 138a-138c.

The slots 138a-138c are configured to allow the first connecting part 20 and the second connecting part 120 to move between a disengaged position and one or more engaged positions with respect to one another. The first connecting part 20 and the second connecting part 120 are in the disengaged position when the tabs 38a-38c of the male pivot member are not disposed within the slots 138a-138c of the female pivot member 122. The first connecting part 20 and the second connecting part 120 are disposed in an engaged position when the tabs 38a-38c of the male pivot member 22 are disposed within the slots 138a-138c of the female pivot member 122.

Figure 7:
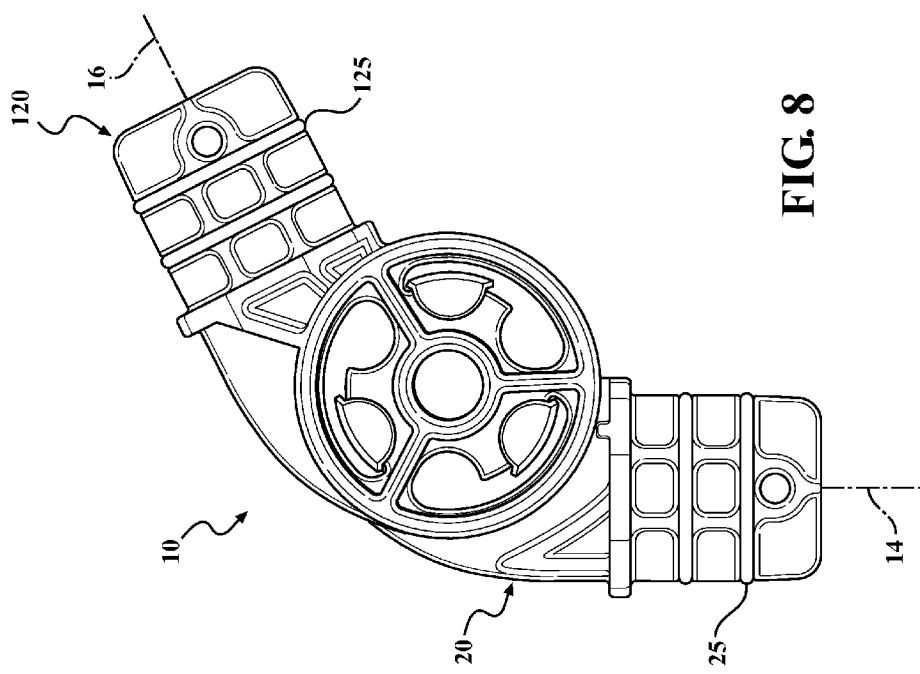
FIG. 7 is a side view of the pivot connector where a first connecting part and the second connecting part are disposed in a second configuration and at a first angular orientation with respect to one another.
Figure 8:
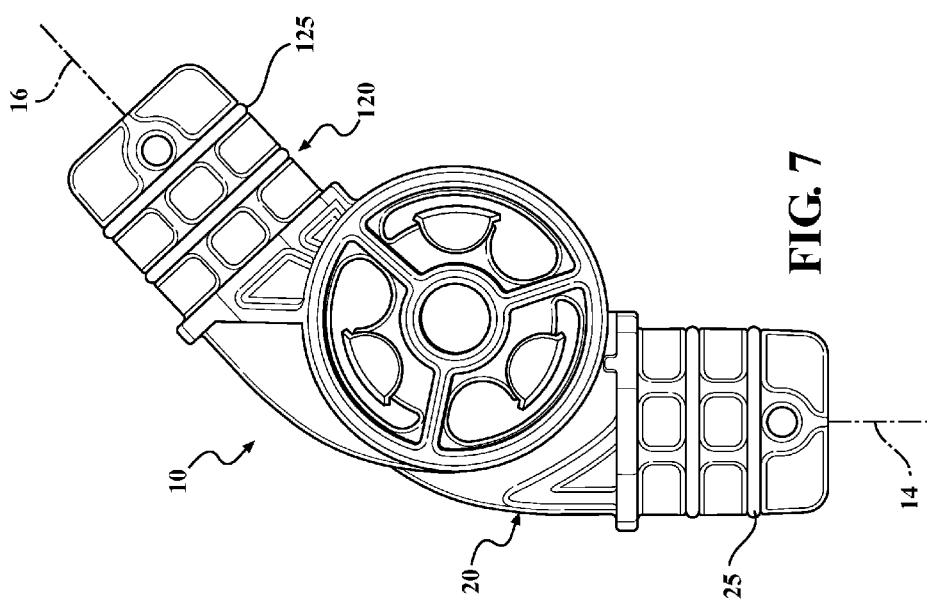
FIG. 8 is a side view of the pivot connector where a first connecting part and the second connecting part are disposed in the second configuration and at a second angular orientation with respect to one another.

Multiple configurations of the engaged position can be established between the first connecting part 20 and the second connecting part 120, as shown in FIGS. 1 and 7-8. For example, when the male pivot member 22 includes three tabs 38a-38c and the female pivot member 122 includes three slots 138a-138c, at least two discrete configurations of the engaged position can be established. Each of these configurations involves a distinct pairing of the tabs 38a-38c with respect to slots 138a-138c. For example, in a first configuration, the first tab 38a is disposed within the first slot 138a. In a second configuration, the first tab 38a is disposed within the third slot 138c. Each of these configurations corresponds to a different limited range of pivotal motion between the first connecting part 20 and the second connecting part 120.

The second mounting member 124 extends along a second mounting axis 16. That is to say that a substantially consistent cross-section is defined by the second mounting member 124 and extends along the second mounting axis 16. The second mounting member 124 is configured to be received within a complementary receiving structure, such as the tubular member 18. Suitable cross-sectional shapes for the second mounting member 124 include, but are not limited to, a circular cross-section, a square cross-section, a rectangular cross-section, or a polygonal cross-section. For example, the second mounting member 124 could be substantially cylindrical.

The second mounting member 124 may be configured to define a friction fit with respect to the tubular member 18. The exterior of the second mounting member 124 may establish a friction fit with the interior of the tubular member 18 directly, or the friction fit may be established by an annular groove on the exterior of the second mounting member 124 and an associated O-ring 125 (FIGS. 7-8) that is received in the groove. This allows the second mounting member 124 to be used with tubular members 18 of varying inside diameter, by selective use or non-use of the O-ring 125.

The structure of the second mounting member 124 may be constructed in any suitable way that results in the desired cross-sectional shape and provides sufficient strength for the second mounting member 124. As an example, the second mounting member 124 could be defined by a series of intersecting radially-extending walls 150 and axially-extending walls 152.

The second mounting member 124 extends from a free end 154 to a fixed end 156. At the fixed end 156, the second mounting member 124 extends from a radially-extending stop flange 158. The stop flange 158 has a cross-sectional area that is slightly larger than that of the second mounting member 124 itself. For example, the stop flange 158 can be sized to correspond with the size of the tube or receiver in which the second mounting member 124 will be received, to limit the maximum degree of insertion of the second mounting member 124 into the tube or receiver.

The stop flange 158 is connected to the female pivot member 122 by a connecting portion 160 that is at least partially interposed between the female pivot member 122 and the stop flange 158. The connecting portion 160 includes structure sufficient to connect the stop flange 158 and the female pivot member 122. The connecting portion 160 could be formed from a plurality of intersecting flanges, including a primary flange 162 and one or more lateral flanges 164. However, any other suitable structure may be used.

The primary flange 162 is connected to the outer annular wall 126 of the female pivot member 122 and to the stop flange 158. The primary flange 162 is disposed at the first end 128 of the female pivot member 122. The primary flange 162 may be positioned such that a portion of the second engagement surface 136 extends continuously past the outer annular wall 126 of female pivot member 122 onto the primary flange 162.

The lateral flanges 164 extend outward from the primary flange 162 and may also be connected to the stop flange 158. The lateral flanges 164 may each extend perpendicularly from the primary flange 162 toward the second end 130 of the female pivot member 122, or away from the second engagement surface 136. The lateral flanges 164 that extend toward the second end 130 are connected to the outer annular wall 126 of the female pivot member 122 and may terminate, for example, at the second end 130 of the female pivot member 122 and at the outer periphery of the stop flange 158.

One or more stabilizer flanges 166 may be formed on either or both of the primary flange 162 and the stop flange 158. The stabilizer flange 166 is positioned adjacent to the second engagement surface 136. The stabilizer flange 166 extends outward from either or both of the primary flange 162 and the stop flange 158. The stabilizer flange 166 extends outward from the primary flange 162 in the direction of the pivot axis 12. The stabilizer flange 166 could extend outward from the primary flange 162 toward the outer periphery of the stop flange 158.

The stabilizer flange 166 has an end portion 168 that is configured to be closely adjacent to the first connecting part 20 when the first and second connecting parts 20, 120 are assembled. Thus, the end portion 168 of the stabilizer flange 166 is engageable with the first connecting part 20 to stabilize the first connecting part 20 with respect to the second connecting part 120 by restraining the first and second connecting parts 120 against large deviations in alignment with respect to the pivot axis 12. In particular, the end portion of the stabilizer flange 166 could be engageable with the outer annular wall 26 of the male pivot member 22 of the first connecting part 20.

The second mounting axis 16 may extend substantially perpendicular to the pivot axis 12. Also, the second mounting axis 16 could be offset from the pivot axis 12 such that the two do not intersect. For example, the second mounting axis 16 could be offset with respect to the pivot axis 12 by a distance that is equal to or greater than half of the width or diameter of the second mounting member 124. Offsetting the second mounting axis 16 in this manner minimizes impingement between the first connecting part 20 and the second connecting part 120 thereby increasing the range of pivotal motion that is possible between the first connecting part 20 and the second connecting part 120.

In use, the pivot connector 10 is assembled by connecting the first connecting part 20 to the second connecting part 120. First, a desired configuration is selected for the first connecting part 20 with respect to the second connecting part 120 by pairing each of the tabs 38a-38c of the male pivot member 22 with respective ones of the slots 138a-138c of the female pivot member 122. This pairing is selected based on a desired limited range of pivotal motion between the first connecting part 20 and the second connecting part 120.

Once the desired configuration has been selected, the tabs 38a-38c are brought into alignment with the entry portions 144 of the slots 138a-138c. The tabs 38a-38c are then passed through the entry portions 144 of the slots 138a-138c until the second portions 42 of the tabs 38a-38c are located adjacent to the interior axial surface 137 of the female pivot member 122, the first portions 40 of the tabs 38a-38c are disposed within the slots 138a-138c, and the first engagement surface 36 of the male pivot member 22 is in engagement with the second engagement surface 136 of the female pivot member 122.

Once the tabs 38a-38c are disposed within the slots 138a-138c, the first connecting part 20 and the second connecting part 120 are pivoted with respect to one another until the first portions 40 of the tabs 38a-38c are disposed within the retaining portions 146 of the slots 138a-138c. This establishes the engaged position of the pivot connector 10. While in this engaged position, the tabs 38a-38c are free to move along the retaining portion 146 of their respective slots 138a-138c from a position that is adjacent to the entry portions 144 of the slots (FIG. 7) to a position that is adjacent to the second ends 142 of the slots (FIG. 8), thereby defining a limited range of pivotal motion of the first connecting part 20 with respect to the second connecting part 120.

The first connecting part 20 may be disconnected from the second connecting part 120 by moving the tabs 38a-38c into registration with the entry portions 144 of the slots 138a-138c and then moving the first connecting part 20 and the second connecting part 120 away from one another along the pivot axis 12.

The first connecting part 20 and the second connecting part 120 could be fabricated from plastic by injection molding. Soft plastic resins, such as polyethylene could be utilized. To reinforce the pivot connector 10, prevent deformation of each of the first connecting part 20 and the second connecting part 120, and to prevent deflection of first and second connecting parts 20, 120 with respect to one another, a rigid support member such as a support rod 312 (FIG. 10) can be received in the central passageway 34 of the first connecting part 20 and the central passageway 134 of the second connecting part. The support rod 312 is fabricated from any suitable substantially rigid material, such as steel, fiberglass or aluminum. The support rod 312 could be solid, or could be a hollow tubular member.

The support rod 312 is engaged with both the first connecting part 20 and the second connecting part 120, such as by a friction fit. By extending through both the first connecting part 20 and the second connecting part 120, the support rod 312 stabilizes the first connecting part 20 with respect to the second connecting part 120, such that the first and second connecting parts remain aligned with respect to the common pivot axis 12. In an assembly including multiple pivot connectors 10, two or more pivot connectors 10 may be disposed on a common support rod 312. For example, a pair of adjacent pivot connectors 10 could be disposed on a common support rod 312 such that both of the pivot connectors 10 are aligned along a common pivot axis 12, as in FIG. 10.

Figure 9:
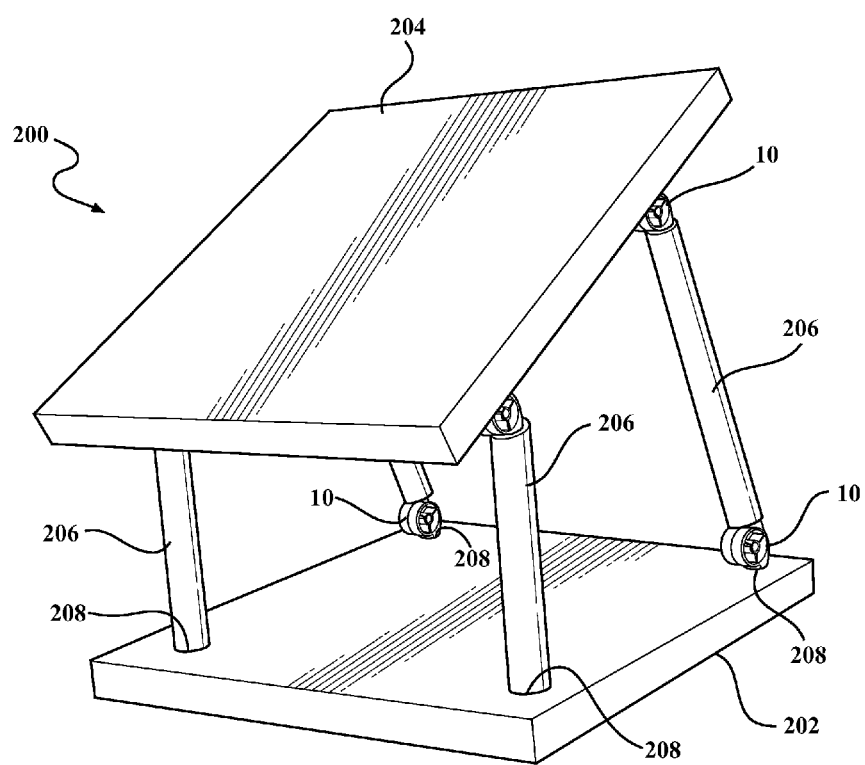
FIG. 9 is a perspective view of a platform assembly that includes a plurality of the pivot connectors.

The pivot connector 10 can be incorporated into a wide variety of different types of modular platform assemblies. By way of example, a modular platform assembly 200 includes a lower platform 202 and an upper platform 204, as shown in FIG. 9. The upper platform 204 is supported with respect to the lower platform 202 by hollow legs that are adapted to receive the mounting members 24, 124 of the pivot connector 10, such as tubular legs 206, and pivot connectors 10 that interconnect the platforms 202, 204 with the tubular legs 206. The pivot connectors 10 are connected to the platforms 202, 204 by placing the mounting members 24, 124 into receivers 208 that are defined in the platforms 202, 204. The receivers 208 may be substantially cylindrical in shape, and may be defined by tubular walls of the platforms 202, 204. The pivot connectors 10 are connected to the tubular legs by placing the mounting members 24, 124 into the tubular legs 206 themselves. The upper platform 204 is supported at an angle with respect to the lower platform 202 by virtue of pivotal adjustment of the pivot connectors 10. The tubular legs 206 are supported at non-orthogonal angles with respect to the platforms 202, 204.

Figure 10:
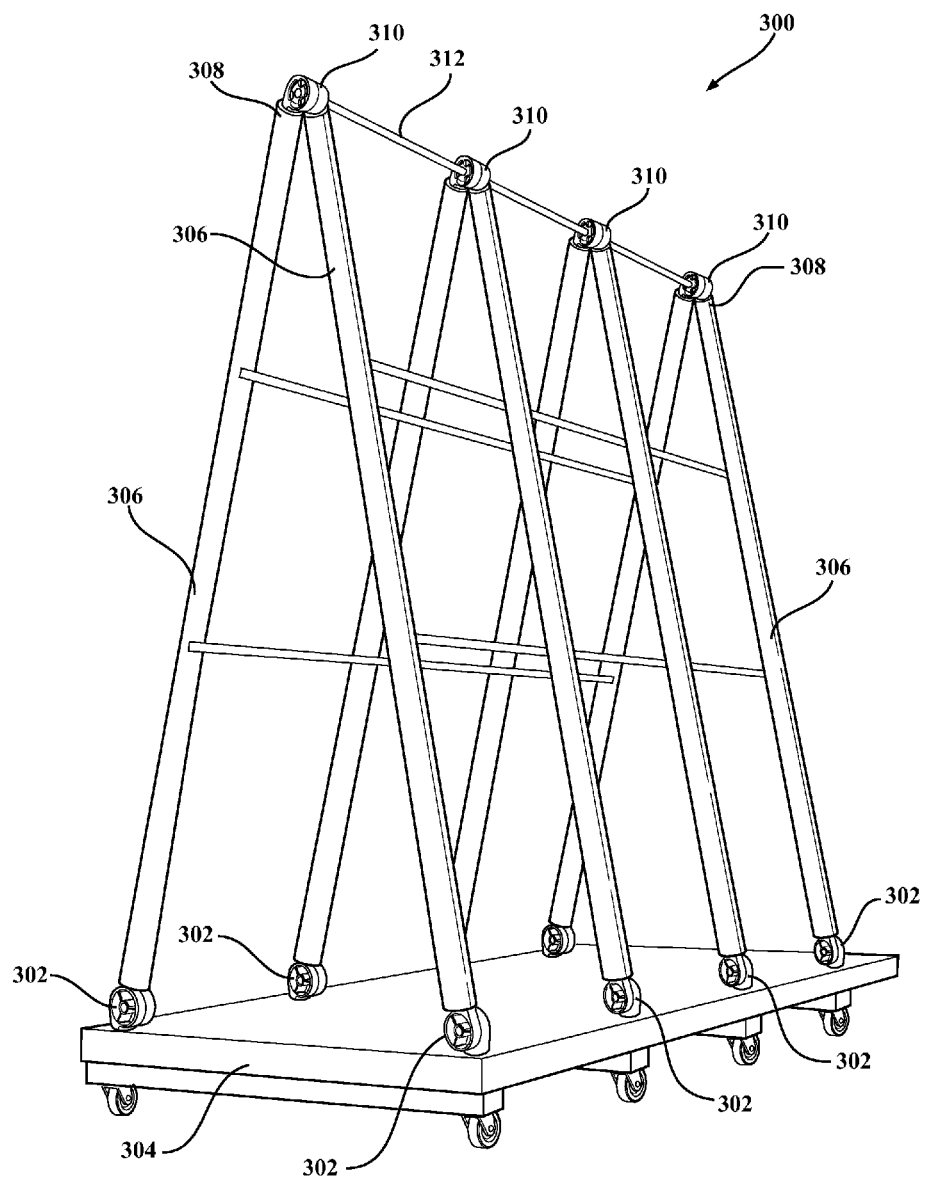
FIG. 10 is a perspective view of a platform-supported A-frame assembly that includes a plurality of the pivot connectors.

Another exemplary structure incorporating the pivot connectors 10 is a platform-supported A-frame assembly 300, as shown in FIG. 10. A first plurality of pivot connectors 302 are connected to a platform 304 as well as to a plurality of tubular legs 306. Pairs of the tubular legs 306 converge toward one another and are adjacent to one another at their upper ends 308. A second plurality of pivot connectors 310 is disposed within the upper ends 308 of the tubular legs 306 to establish an A-frame configuration for pairs of the tubular legs 306. Multiple A-frames are longitudinally spaced along the platform 304, and the support rod 312 may be supported between longitudinally spaced pairs of the second plurality of pivot connectors 310 by placing the support rod 312 through the central passageways 34, 134 of the first and second connecting parts 20, 120 of each of the pivot connectors of the second plurality of pivot connectors 310. The tubular legs 306 are supported at non-orthogonal angles with respect to the platforms 304. The second plurality of pivot connectors 310 connects pairs of the tubular legs 306 at non-orthogonal angles with respect to one another.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pivot connector, comprising:
   a first connecting part having:
      a male pivot member including a first engagement surface and a plurality of tabs that extend outward from the first engagement surface, and
      a first mounting member that is connected to the male pivot member; and
   a second connecting part having:
      a female pivot member including a wall that includes an interior surface, a second engagement surface, and a plurality of arcuate slots that extend through the wall from the second engagement surface to the interior surface, and
      a second mounting member that is connected to the female pivot member,
      wherein the first connecting part is connectable to the second connecting part such that the first engagement surface of the male pivot member is in engagement with the second engagement surface of the female pivot member, and each tab of the plurality tabs is receivable in a respective slot of the plurality arcuate slots such that the first connecting part is pivotable with respect to the second connecting part around a pivot axis over a limited range of motion, and each tab from the plurality of tabs is engageable with the interior surface of the wall of the female pivot member to restrain movement of the male pivot member away from the female pivot member along the pivot axis.

2. The pivot connector of claim 1, wherein the first engagement surface of the male pivot member extends substantially perpendicular to the pivot axis and the second engagement surface of the female pivot member extends substantially perpendicular to the pivot axis.

3. The pivot connector of claim 1, wherein the plurality of tabs of the male pivot member are arranged in a substantially circular array around the pivot axis and the plurality of arcuate slots of the female pivot member are arranged in a substantially circular array around the pivot axis.

4. The pivot connector of claim 1, wherein each tab of the plurality of tabs of the male pivot member includes a first portion that extends outward with respect to the first engagement surface of the male pivot member and a second portion that is spaced from the first engagement surface by the first portion and is engageable with the interior surface of the female pivot member.

5. The pivot connector of claim 1, wherein the interior surface of the wall of the female pivot member and the second engagement surface of the wall of the female pivot member face in opposite directions with respect to one another.

6. The pivot connector of claim 5, wherein each tab of the plurality of tabs of the male pivot member includes a first portion that extends outward with respect to the first engagement surface of the male pivot member and a second portion that is spaced from the first engagement surface by the first portion and is engageable with the interior surface of the female pivot member, and each slot of the plurality of slots of the female pivot member includes an entry portion that is configured to allow the second portion of a respective tab of the plurality of tabs to pass therethrough, and a retaining portion that is configured to prevent the second portion of the respective tab from passing therethrough to restrain the first connecting part against moving axially away from the second connecting part.

7. The pivot connector of claim 6, wherein the retaining portion of each slot prevents the second portion of the respective tab from passing therethrough by engagement of the second portion of each tab with the interior surface of the female pivot member adjacent to the retaining portion of the slot.

8. The pivot connector of claim 1, wherein the first mounting member extends along a first mounting axis that is substantially perpendicular to the pivot axis and the second mounting member extends along a second mounting axis that is substantially perpendicular to the pivot axis.

9. The pivot connector of claim 1, wherein the first mounting member and the second mounting member are each substantially cylindrical.

10. The pivot connector of claim 1, wherein the first connecting part and the second connecting part are connectable to one another in at least a first configuration having a first range of motion of the first connecting part with respect to the second connecting part, and a second configuration having a second range of motion of the first connecting part with respect to the second connecting part, wherein each of the tabs is in engagement with a different one of the arcuate slots in the first configuration as compared to the second configuration.

11. A pivot connector, comprising:
a first connecting part having:
  a male pivot member including a first engagement surface and a plurality of tabs that extend outward from the first engagement surface, and
  a first mounting member that is connected to the male pivot member; and
a second connecting part having:
  a female pivot member including a second engagement surface and a plurality of arcuate slots that extend through the second engagement surface, and
  a second mounting member that is connected to the female pivot member,
  wherein the first connecting part is connectable to the second connecting part such that the first engagement surface of the male pivot member is in engagement with the second engagement surface of the female pivot member, each tab of the plurality tabs is receivable in a respective slot of the plurality arcuate slots such that the first connecting part is pivotable with respect to the second connecting part around a pivot axis over a limited range of motion, and the first mounting member extends along a first mounting axis that is offset from the pivot axis and the second mounting member extends along a second mounting axis that is offset from the pivot axis.

12. A pivot connector, comprising:
a first connecting part having:
  a male pivot member including a first engagement surface and a plurality of tabs that extend outward from the first engagement surface, and
  a first mounting member that is connected to the male pivot member; and
a second connecting part having:
  a female pivot member including a second engagement surface and a plurality of arcuate slots that extend through the second engagement surface, and
  a second mounting member that is connected to the female pivot member,
  wherein the first connecting part is connectable to the second connecting part such that the first engagement surface of the male pivot member is in engagement with the second engagement surface of the female pivot member, each tab of the plurality tabs is receivable in a respective slot of the plurality arcuate slots such that the first connecting part is pivotable with respect to the second connecting part around a pivot axis over a limited range of motion, the first mounting member and the second mounting member are each substantially cylindrical, and the first mounting member extends along a first mounting axis that is substantially perpendicular to the pivot axis and is offset from the pivot axis and the second mounting member extends along a second mounting axis that is substantially perpendicular to the pivot axis and is offset from the pivot axis.

13. The pivot connector of claim 12, wherein the first engagement surface of the male pivot member extends substantially perpendicular to the pivot axis, the second engagement surface of the female pivot member extends substantially perpendicular to the pivot axis, the plurality of tabs of the male pivot member are arranged in a substantially circular array around the pivot axis, and the plurality of arcuate slots of the female pivot member are arranged in a substantially circular array around the pivot axis.

14. The pivot connector of claim 13, wherein each tab of the plurality of tabs of the male pivot member includes a first portion that extends outward with respect to the first engagement surface of the male pivot member and a second portion that is spaced from the first engagement surface by the first portion and is engageable with an interior surface of the female pivot member that is opposite the second engagement surface.

15. The pivot connector of claim 14, wherein each slot of the plurality of slots of the female pivot member includes an entry portion that is configured to allow the second portion of a respective tab of the plurality of tabs to pass therethrough and a retaining portion that is configured to prevent the second portion of the respective tab from passing therethrough to restrain the first connecting part against moving axially with respect to the second connecting part, and the retaining portion of each slot prevents the second portion of the respective tab from passing therethrough by engagement of the second portion of each tab with the interior surface of the female pivot member adjacent to the retaining portion of the slot.

16. A platform assembly, comprising:
a platform having a receiver formed therein;
a leg;
a first connecting part having:
  a male pivot member including a first engagement surface and a plurality of tabs that extend outward from the first engagement surface, and
  a first mounting member that is connected to the male pivot member; and
a second connecting part having:
  a female pivot member including a wall that includes an interior surface, a second engagement surface, and a plurality of arcuate slots that extend through the wall from the second engagement surface to the interior surface, and
  a second mounting member that is connected to the female pivot member,
  wherein the first connecting part is connectable to the second connecting part such that the first engagement surface of the male pivot member is in engagement with the second engagement surface of the female pivot member, each tab of the plurality tabs is receivable in a respective slot of the plurality arcuate slots such that the first connecting part is pivotable with respect to the second connecting part around a pivot axis over a limited range of motion, each tab of the plurality of tabs is engageable with the interior surface of the wall of the female pivot member to restrain movement of the male pivot member away from the female pivot member along the pivot axis, one of the first mounting member of the first connecting part or the second mounting member of the second connecting part is disposed within the leg, and the other of the first mounting member of the first connecting part or the second mounting member of the second connecting part is disposed within the receiver of the platform.

17. The platform assembly of claim 16, wherein the first mounting member extends along a first mounting axis that is substantially perpendicular to the pivot axis and is offset from the pivot axis and the second mounting member extends along a second mounting axis that is substantially perpendicular to the pivot axis and is offset from the pivot axis.

18. The platform assembly of claim 17, wherein the first engagement surface of the male pivot member extends substantially perpendicular to the pivot axis, the second engagement surface of the female pivot member extends substantially perpendicular to the pivot axis, the plurality of tabs of the male pivot member are arranged in a substantially circular array around the pivot axis, and the plurality of arcuate slots of the female pivot member are arranged in a substantially circular array around the pivot axis.

19. The platform assembly of claim 18, wherein each tab of the plurality of tabs of the male pivot member includes a first portion that extends outward with respect to the first engagement surface of the male pivot member and a second portion that is spaced from the first engagement surface by the first portion and is engageable with the interior surface of the female pivot member, the second portion of each tab and the first engagement surface of the male pivot member cooperating to define a channel that is adapted to receive a portion of the wall of the female pivot member to restrain movement of the male pivot member away from the female pivot member along the pivot axis.

20. The platform assembly of claim 19, wherein each slot of the plurality of slots of the female pivot member includes an entry portion that is configured to allow the second portion of a respective tab of the plurality of tabs to pass therethrough and a retaining portion that is configured to prevent the second portion of the respective tab from passing therethrough to restrain the first connecting part against moving axially with respect to the second connecting part, and the retaining portion of each tab prevents the second portion of the respective tab from passing therethrough by engagement of the second portion of each tab with the interior surface of the female pivot member adjacent to the retaining portion of the slot.

\* \* \* \* \*